United States Patent [19]

Alkasab

[11] 4,220,135
[45] Sep. 2, 1980

[54] PERIODIC SOLAR COLLECTOR

[76] Inventor: Kalil A. Alkasab, 5742 Bradford Way, Hudson, Ohio 44236

[21] Appl. No.: 121

[22] Filed: Jan. 2, 1979

[51] Int. Cl.³ .............................................. F24J 3/02
[52] U.S. Cl. .................................... 126/417; 126/438
[58] Field of Search ........................ 126/417, 438, 422

[56] References Cited

U.S. PATENT DOCUMENTS

| | | | |
|---|---|---|---|
| 3,929,122 | 12/1975 | Alkasab | 126/438 |
| 3,972,316 | 8/1976 | Alkasab | 126/417 |

Primary Examiner—George T. Hall
Attorney, Agent, or Firm—Richard D. Dixon

[57] ABSTRACT

The present invention relates to a solar energy collector which includes a housing which has two solar absorption panels on the exterior surface thereof and an energy collection chamber therein. A motor is coupled to the housing for moving the solar absorption panels between a first position, characterized as being illuminated with solar radiaton, and a second position, characterized as being in thermal communication with a heat transfer fluid contained within the energy collection chamber of the housing. A heat transfer device is immersed in the primary fluid within the energy collection chamber for removing thermal energy therefrom. A control system is coupled to the motor for moving the solar absorption panels between the first and second positions in a transient unsteady mode.

11 Claims, 3 Drawing Figures

PERIODIC SOLAR COLLECTOR

BACKGROUND OF THE INVENTION

I. Field of the Invention

The present invention relates to solar energy collectors and particularly to the type of solar collectors which are exposed to solar illumination in one position and then moved into a second position for releasing the absorbed solar energy.

II. Description of the Prior Art

Flat plate structures are among the oldest and now the most prolific designs for solar collectors. These collectors are generally formed from a large copper panel to which copper tubing is welded, thereby allowing a fluid circulating through the tubing to absorb the termal energy collected by the flat plate collector.

Early attempts at improving the efficiency of the typical flat plate solar collector are disclosed in U.S. Pat. No. 3,972,316, issued to the present applicant, for a motor driven endless belt absorber member which is continuously moved through a thermal absorption area and then into a heat sink area. While this design is suitable for specific applications, the complicated roller guides and the relatively expensive flexible endless belt absorber significantly limit the economically justified applications for the disclosed device.

A still earlier design for a flat plate solar collector is disclosed by the present inventor in U.S. Pat. No. 3,929,122. This dislosure teaches the use of a flat plate energy collector which includes a series of spaced-apart members which are arranged in a plane above the flat plate collector. The tops of the spaced members are blackened in order to directly absorb solar energy, and the sides of these spaced members are provided with reflectors for focusing and directing additional solar energy onto the subjacent solar plate collector.

While each of these prior art references disclose a solar collector with moving parts, none of the prior art references teaches the use of a relatively fluid impervious housing having heat transfer fluid therein, with the external surfaces of the housing being oriented so that one collector surface not in communication with the heat transfer fluid will be illuminated by solar radiation, and then rotated into a second non-illuminated position in which substantially the entire interior surface of the collector panel is coupled into direct thermal communication with the heat transfer fluid. In this manner the solar energy absorbed when the solar collector panel is in the first position may be liberated when the solar collector panel is moved into the second position. Since this second position is characterized as being in thermal communication with the cooler primary heat transfer fluid, the efficiency of the heat transfer process is improved. By coupling the solar collector panels in a 180 degree offset relationship, one of the solar collectors may be exposed to solar energy while the opposite solar collector is liberating the previously absorbed thermal energy to the heat transfer fluid.

The main reason for limiting the applications of the traditional flat-plate solar collector to hot water and space heating uses is the inability of the flat-plate collector to operate with reasonable thermal efficiency at temperatures much over 100° C. due to heat losses by convection and radiation from the top of the collector.

In contrast to the prior art, the present invention relates to a periodic flat-plate solar energy collector which implements features that extend the operating temperature range, while significantly increasing the thermal efficiency at these higher temperatures. This new design concept should result in making the system capable of actuating most of the commercially available absorption type air-conditioning units at a reasonable coefficient of performance.

The increase in thermal efficiency of the periodic collector is achieved by reducing the radiation and convection heat losses from the top of the collector, while maximizing the value of the collector efficiency factor. The reduction in heat losses is effected by substantially reducing the average operating temperature of the absorption plate while attaining almost as high a maximum temperature as that attained by a selectively coated traditional flat-plate collector. This reduction in the temperture of the absorption plate is accomplished by operating the collector in a transient unsteady manner. Thus, when the absorption plate is exposed to the solar radiation it is allowed to absorb energy only for a limited period of time. At the end of this period the collector has been heated to just a few degrees below the steady state temperature that can be attained by the plate. The absorption plate is then moved from the ambient position and placed in thermal communication with a working fluid where thermal energy can be transferred. This controlled quantity of the working fluid is kept confined inside the collector until it is heated to the desired temperature by the repeated action of the absorption plate. The working fluid is then pumped out of the collector to a hot water storage tank and replaced by an equal amount of cold water from a cold water storage tank.

Thus, although the maximum operating temperature of the absorption plate of a periodic collector can be almost as high as that of the traditional stationary flat-plate collector, the average operating temperature is significantly lower. This average temperature is equal to the mean of the maximum temperature attained and the mean temperature of the working fluid. Calculations, for a periodic collector operating with a maximum absorption plate temperature of 350° F. and an ambient temperature of 80° F., indicate an average plate temperature of about 260° F., and a consequent reduction of heat losses by more than 35 percent.

The increased efficiency of the periodic collector is also due, at least in part, to the high efficiency of the energy exchange between the absorption plate and the solar radiation, and between the absorption plate and the heat transfer fluid. The working fluid is contained inside a parallelopiped structure with the two absorption plates located at the two opposite faces or sides of the structure. Each of the absorption plates is made of a sheet of copper, or other suitable material, that is selectively coated with copper oxide or other suitable selective coating. Further, the plate is to be corrugated into a series of "V's" such that any beam of incident light, within a given range of angles of incidence, will suffer more than one reflection before emerging from the "V". Thus, this corrugated form provides an extended surface that improves the heat transfer to the working fluid and also increases the absorption coefficient ($\alpha$) of the plate almost to unity while the emissivity of the plate is kept very low.

The combined effect of all these factors can best be summarized by considering the following expression for the instantaneous efficiency $$\eta = F[\alpha\tau - q_l/I]. \tag{1}$$

where:
- $\tau$ = transmission coefficient of the system
- $I$ = solar radiation intensity per unit area
- $q_l$ = rate of heat loss per unit area from the absorption plate
- $F$ = factor representing efficiency of heat extraction from the absorption plate.

In addition to the increased efficiency developed by removing the typical welded tubes from the periodic collector and by bringing the working fluid in direct contact with the absorption plate, the entire surface of the corrugated plate is used as the heat transfer area. Thus, the value of F in equation (1) becomes almost a unity. On the other hand, the value of $\alpha$ has almost been brought to unity as a result of multiple absorption of the incident solar radiation by the corrugated "V" form. Also, the value $q_l$ has been significantly reduced by the combined effect of: (a) the reduction in the emissivity of the absorption plate surface due to the selective coating, and (b) the reduction in the average temperature of the absorption plate as it has been discussed earlier. Thus, at elevated operating tempertures, calculations predict that the periodic collector is about 40 percent more efficient than the traditional stationary flat-plate collector.

The elimination of the welds between the heat exchanger tubes and the absorption plate should result not only in direct savings in material and labor cost, but also should provide the designer with more freedom in selecting the type and surface geometry of the absorption plate material. Thus, materials for the absorption plate in the periodic collector can cover a wide spectrum ranging from plastics to several types of metals and their alloys. This fact coupled with higher thermal efficiency should reduce both the cost per unit collector area and the amount of collector area needed for a certain task.

SUMMARY OF THE INVENTION

The present invention relates to an apparatus and method which relate to transient, unsteady mode solar energy collectors. A housing is provided which includes at least two solar absorption sides on the external surface thereof which define an internal collection chamber within the housing. A motor is coupled to the housing for moving, responsive to a motive signal, the solar absorption sides between a first position, characterized by illumination with solar energy, and a second position characterized by being in thermal communication with a heat transfer fluid. The heat transfer fluid is typically circulated through the energy collection chamber within the housing for removing the thermal energy therefrom. A conrol system is coupled to the motor for generating the motive signal, thereby exchanging positions between the two solar absorption sides in order to initialize the process of collecting solar energy.

BRIEF DESCRIPTION OF THE DRAWINGS

Other objects, features and advantages of the present invention will be apparent from a study of the written description and the drawings in which.

Figure 1:
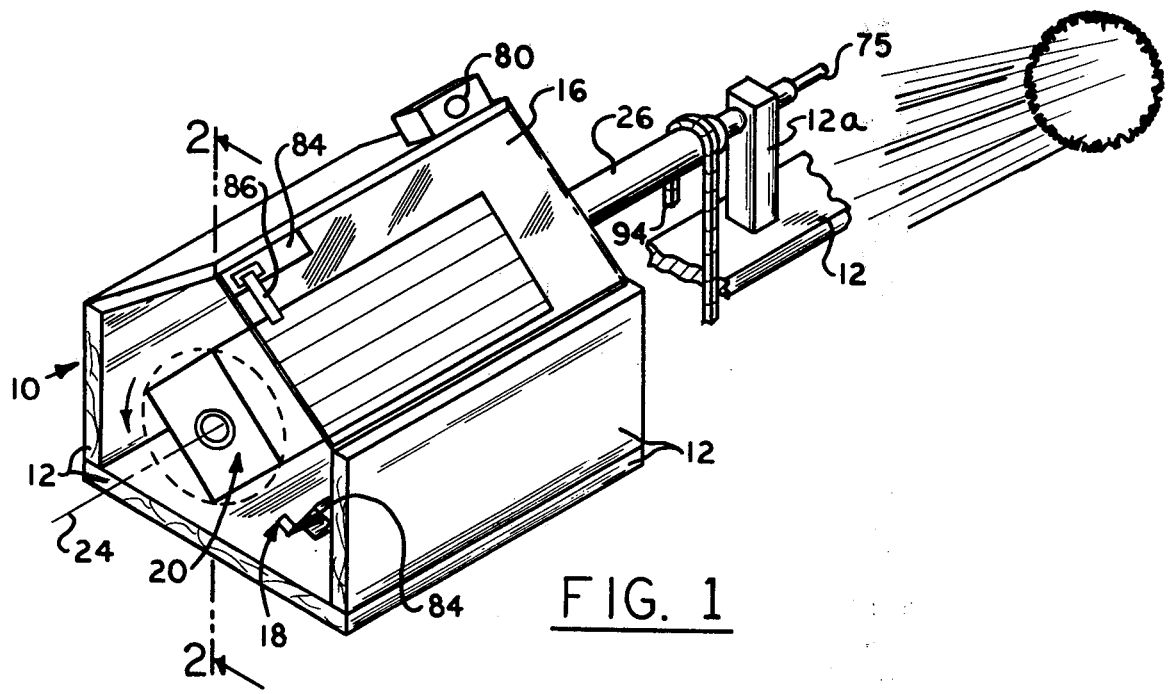
FIG. 1 illustrates a left-side perspective and partially sectioned view of a preferred embodiment of the periodic solar collector in accordance with the teachings of the present invention.

In the drawings, like reference characters refer to like parts throughout the several views of each of the embodiments of the present invention. However, variations and modifications may be effected without departing from the spirit or scope of the concepts of the disclosure and the appended claims. It should also be observed that the elements and operation of the embodiment of the present invention have been illustrated in somewhat simplified form in each of the drawings and in the following specification in order to eliminate unnecessary details which would be apparent to one skilled in this art.

DETAILED DESCRIPTION OF THE PREFERRED EMBODIMENT

Figure 2:
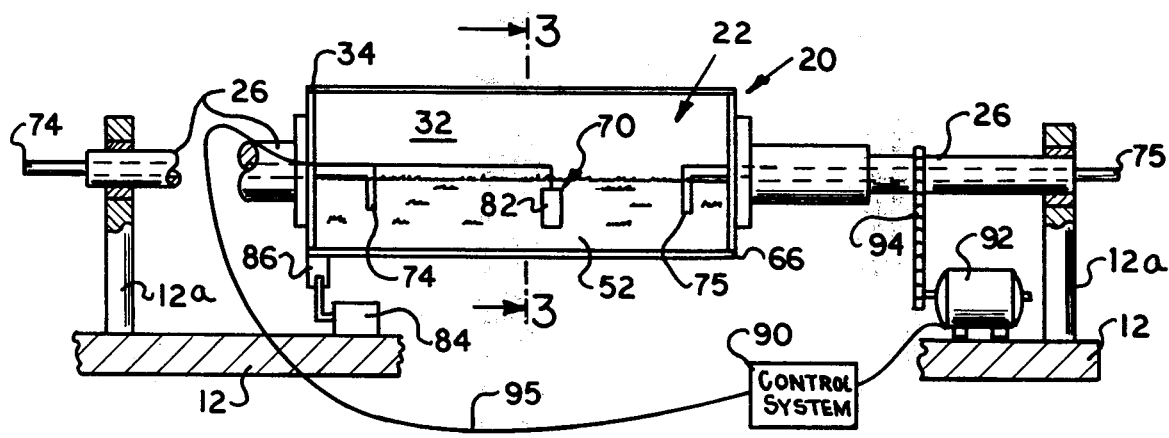
FIG. 2 illustrates a partially sectioned and cutaway frontal elevation of the preferred embodiment viewed along section lines 2—2 as shown in FIG. 1.

A preferred embodiment of the periodic solar energy collector is shown generally as 10 in FIGS. 1 and 2. The device includes a frame 12 which comprises a plurality of insulated sides which are coupled together so as to form a void 18 therewithin. Another side 16 comprises a transparent or glass panel which allows solar radiation to pass from the outside and into the void 18. The internal surfaces of each of the panels of the frame 12 is coated with a reflective surface so as to generally focus any incident solar radiation onto a housing, shown generally as 20. The housing 20 comprises a generally elongated parallelopiped structure which is coupled about its longitudinal axis 24 to a rotating shaft 26. The shaft 26 communicates through end plates or end sides of the frame 12 (which are not shown in FIGS. 1 or 2 for the sake of clarity).

Figure 3:
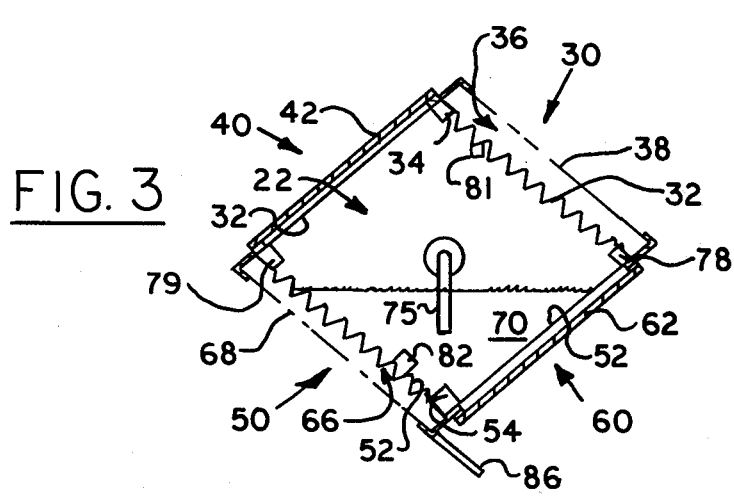
FIG. 3 illustrates a partial end-section view taken along section lines 3—3 as shown in FIG. 2.

As illustrated in FIGS. 2 and 3, the preferred embodiment of the housing 20 includes a first solar absorption side 30, and a second solar absorption side 50 located on the opposite side of the longitudinal axis 24 and the shaft 26. The first solar absorption side 30 includes a corrugated solar absorption panel 32 and a plate of transparent glass or plastic material 38 juxtaposed therewith so as to define an insulative void 36 therebetween. The corrugated solar absorption panel 32 is constructed typically of copper or one of its alloys, or it may be constructed of any other material with suitable thermal conductivity and structural integrity. The outer surface of the solar absorption panel 32 is typically coated with a black selective or non-selective paint in order to maximize the absorption of solar energy which passes through the glass 38 and becomes incident thereupon.

The solar absorption panel 32 is corrugated with a series of hills and troughs (or "V's"), each of which have an included angle of approximately 55°. These corrugations not only provide an extended surface area for contact with the solar radiation and the heat transfer fluid, but they also serve to capture the multiple reflections of the incident solar radiation upon the solar absorption panel.

A bronze or other similar insulating support bar 34 is coupled to the solar absorption panel 32 generally at the apex thereof. A continuous but non-corrugated section of the solar absorption panel 32 continues downwardly from the apex bronze bar 34 for forming the inside surface of a passive side 40 (or thermal storage plate) of the housing 20. In this manner the thermal conductivity of the continuous solar absorption panel 32 will allow the transmission of thermal energy from the portion of the solar absorption panel 32 adjacent the first solar absorption side 30 into the storage section of the solar absorption panel 32 which forms part of the passive side 40. A plate 42 of plywood, cardboard, or other similar insulative material is juxtaposed on the outside of the solar absorption panel 32 on the passive side 40 for reducing the loss of thermal energy therefrom. The inside surface of plate 42 may be covered with a sheet of reflective foil in order to assist in reflecting incident thermal energy.

In a similar manner the opposite side of the housing 20 is formed from a second corrugated solar absorption side 50 and another passive side 60. The second solar absorption side 50 includes a second corrugated solar absorption panel 52 and a second piece of transparent glass 68 for defining therebetween an insulative void 66. The second solar absorption side 52 is attached to a bronze bar 54 and then communicates upwardly along the inside surface of the passive side 60. A piece of plywood or other similar type of insulative material 62 may be placed along the external surface of the passive side 60 in order to reduce the amount of heat lost therethrough.

These two mirror image upper and lower sides of the housing 20 are joined with two additional bronze bars 78 and 79 for insulating the flow of thermal energy between the solar absorption panels 32 and 52.

The lower section of an energy absorbing chamber 22, defined by the interior surfaces of the solar absorption panels 32 and 52, is filled with a heat transfer fluid 70 which may be water, a mixture of water and ethyl glycol, or other similar liquid which exhibits favorable thermal conductivity properties for conducting thermal energy from the second solar absorption panel 52. A heat transfer fluid transfer conduit 74 is shown schematically in FIGS. 2 and 3 as emptying into the void 22 at a level below the upper level of the primary fluid 70. Another section of the fluid transfer conduit 75 communicates outwardly from the housing 20 at a point generally along the longitudinal axis 24 and within the shaft 26.

The first section 74 of the fluid transfer conduit is typically coupled through a pump to a storage tank (both not shown for clarity) for the cold fluid, while the second section 75 of the fluid transfer conduit is coupled through a pump to a storage tank (both not shown) for the heated fluid. When the fluid 70 within the void 22 is heated through thermal communication with one of the solar absorption sides 30 or 50, then the appropriate temperature sensor 81 or 82 will signal the control system 90 to actuate the pump for transferring the heated fluid 70 from the void 22, through the second section 75 of the fluid transfer conduit and into the storage tank for the heated fluid. Then, the same pump may be interchangeably coupled to the first section 74 of the fluid transfer conduit for pumping primary fluid from the cold storage tank and into the void 22 within the housing 20. It is also envisioned that a closed system heat exchanger may be immersed within the heat transfer fluid for removing energy therefrom.

As previously described, the shaft 26 is coupled to the housing 20 for rotating it about its longitudinal axis 24 in order to expose to solar radiation the first solar absorption side 30 and then the second solar absorption side 50. The shaft 26 includes a sprocket which engages a chain 94 which then operatively engages with a motor 92 which is controlled by an electrical control system, shown generally as 90.

In the preferred embodiment of the present invention it is envisioned that the housing 20 will be rotated first 180 degrees in order to expose one of the solar absorption sides, and then rotated 180 degrees in the opposite direction to expose the other solar absorption side. In this manner the requirement for slip-rings and complicated drive mechanism may be eliminated.

There are several basic forms of the control system 90 which are presently envisioned. The first or simplified form includes a timing system which intermittently actuates the motor 92 so that the housing 20 may be rotated approximately 180 degrees in order to expose one of the solar absorption sides 30 or 50 to the solar radiation. A more sophisticated control system 90 includes the pair of temperature sensors 81 and 82 which are coupled respectively to the solar absorption panels 32 and 52 for sensing the temperatures thereof. These temperature signals are then transmitted through the appropriate circuit conductors 95 into the control system 90. Well known electronic systems may be utilized in order to actuate the motor 92 responsive to the temperature of the illuminated solar absorption panel 32 rising above a predetermined limit. An even more sophisticated system may use a differential comparator to compare the signals from the temperature sensors 81 and 82 in order to determine when the maximum temperature differential between the temperature sensors 81 and 82 has been achieved, or when a predetermined rate of change between the two temperatures has been achieved, and responsive thereto energizing the electrical motor 92 for rotating the housing 20.

While FIGS. 1 and 2 illustrate a single housing 20 being coupled to the shaft 26, it may be desirable for certain applications to couple a plurality of shafts in parallel registration with the original shaft 26 so that a single motor 92 may be utilized to rotate more than one housing. Under these circumstances a single sensor or pair of temperature sensors 81 and 82 in a preselected one of the housings 20 may be utilized for sensing the tempertures of the two solar absorption panels.

With continuing reference to FIGS. 1 through 3, it may be desirable in certain high efficiency applications to couple a solar position sensor 80 to the periodic solar collector system in order to accurately sense the position of the sun and to orient the angular position of the housing 20 about its longitudinal axis 24 to a position generally perpendicular to the incident solar radiation. This solar sensor 80 may be coupled through appropriate circuit conductors to the control system 90 in order to accurately determine the final angular stopping position of the rotation of the shaft 26.

If it is undesirable for economic reasons to utilize an active electronic solar sensor 80, then it may be possible to utilize one or more electrical limit switches 84 coupled to the frame 12. Each of these switches 84 may be actuated by an arm 86 coupled to the housing 20 for sensing the final angular position of the shaft 26. The arm may be designed in order to provide a mechanical adjustment to account for elevational variations in the position of the sun.

A large number of these periodic solar collectors may be operationally integrated in order to increase the total thermal energy absorbed by the system. The periodic solar collectors may be coupled in parallel, in series, or in series-parallel as required by the specific operating parameters of the particular application. As described previously, each of these periodic solar collectors may be mounted on a common shaft 26, or each may be mounted on separate or grouped shafts as required.

The operation of the preferred embodiment will now be described with reference to FIGS. 1, 2 and 3. It will first be assumed that the first solar absorption side 30 has been properly oriented in a position generally perpendicular to the incident solar radiation in order to maximize the absorption thereof. As the solar energy passes through the glass panel 38 and through the void 36 it illuminates the corrugated black solar absorption panel 32. This incident solar radiation causes a thermal heating of both sections of the solar absorption panel 32 adjacent to the first solar absorption side 30 and adjacent to the passive side 40. The temperature of the solar absorption panel 32 will be sensed by the temperature sensor 81 which will signal the control system 90 to actuate the motor 92 to rotate the shaft 26 and the housing 20 coupled thereto when the temperature exceeds the predetermined limit. The control system 90 will rotate the housing 20 by 180 degrees so that the opposite or second solar absorption side 50 will then be exposed to the solar radiation.

After the rotation of the housing 20, the first solar absorption panel 32 will then be in thermal communication with the fluid 70. Since the fluid 70 is considerably cooler than the first solar absorption panel 32 (typically 350° F.), thermal energy will be transferred from the first solar absorption panel 32 into the fluid 70. After the temperature of the fluid 70 reaches a predetermined limit, the fluid may then be removed through the closed fluid system 75 to the storage tank where thermal energy may be removed for other useful purposes. Additional fluid may be pumped into the void 22 in order to absorb additional thermal energy from the first solar absorption panel 32. When the second temperature sensor 82 signals the control system 90 that the second solar absorption panel 52 has reached the predetermined temperature limit, the motor 92 will be energized in order to rotate the first solar absorption side 30 in the opposite direction from the first rotation and back to the original or first position for being illuminated by the solar radiation. This rotation will place the second solar absorption panel 52 in direct thermal communication with the primary fluid 70 so that the collected solar thermal energy may be transferred thereto. The thermal collection purposes may then be repeated through the periodic rotation of the solar collector.

When compared with existing flat-plate solar collector systems the present invention not only is more efficient in collecting the solar energy, but it also reduces the requirement for external electrical energy since the heat transfer fluid pump and the rotational motor 92 operate only intermittently. In previous flat-plate solar collector designs the pump was required to run during substantially all of the available solar hours. By comparison, the pump for circulating the heat transfer of fluid of the present invention operates in periods of 3 minutes for about 4 times per hour. Therefore, the electrical energy required to circulate the fluid has been reduced approximately by a factor of 4 or 5.

In accordance with the provisions of the United States Patent Laws, a particular preferred embodiment of the present invention and an alternate embodiment have been described in detail. The principles of the present invention have been described in the best mode in which it is now contemplated that such principles may be applied. However, it should be understood that the construction shown and described in the attached specification and drawings are merely illustrative and that the invention is not limited thereto. Accordingly, alterations and modifications which readily suggest themselves to persons skilled in the art, without departing from the true spirit of the disclosure herein, are intended to be included in the scope of the following claims.

I claim:

1. A transient mode solar energy collection apparatus comprising in combination:
    a housing having at least two solar absorption sides which define an energy collection chamber within said housing;
    motive means coupled to said housing for moving, responsive to a motive signal, said solar absorption sides into one of a first position characterized as being illuminated by solar energy and a second position;
    a heat transfer fluid contained generally within said energy collection chamber of said housing so as to be in operative communication with said solar absorption side in said second position for absorbing thermal energy therefrom;
    first means carried by said housing for coupling with and removing thermal energy from said heat transfer fluid; and
    control signal means operatively coupled to said motive means for generating said motive signal, thereby reorienting one of said solar absorption sides into said first position for receiving solar energy and reorienting a previously illuminated one of said solar absorption sides into said second position for transmitting thermal energy into said heat transfer fluid.

2. The solar energy collector as described in claim 1 wherein said control signal means comprises a timer for periodically generating said motive signal.

3. The solar energy collector as described in claim 1 wherein said control signal means includes:
    temperature sensors coupled to said solar absorption sides for generating a signal representative of the temperature of said solar absorption side; and
    comparator means coupled to said temperature sensors for generating said motive signal responsive to said temperature signal exceeding a predetermined maximum limit.

4. The solar energy collector as described in claim 1 wherein each of said solar absorption sides includes a thermally conductive plate having a first surface for receiving and converting solar radiation into thermal energy, and a second surface for thermally communicating with said heat transfer fluid when siad solar absorption side is in said second position.

5. The solar energy collector as described in claim 4 wherein each of said solar absorption sides are located on opposite sides of a parallelopiped movable about a longitudinal axis of rotation, whereby said housing may be rotated to interchaneably move said solar absorption sides between said first and said second positions.

6. The solar energy collector as described in claim 5 wherein each of said solar absorption sides further includes a transparent plate juxtaposed with said first surface of said solar absorption side for defining a first insulative void therebetween.

7. The solar energy collector as described in claim 6 wherein said first surface of said solar absorption sides includes a plurality of corrugations therein, thereby increasing the surface area of said solar absorption side and reducing the energy lost due to re-radiation of the solar energy.

8. The solar energy collector as described in claim 7 wherein said first means comprises means for removing said heat transfer fluid from said energy collection chamber after heating and substituting a cooler volume of said heat transfer fluid therefore.

9. The solar energy collector as described in claim 6 wherein said motive means comprises in combination:
   a frame having a plurality of generally reflective sides which define a void therein and an opening communicating into said void, said frame also including a generally tranparent insulative side for covering said opening but allowing solar energy to pass therethrough;
   a shaft for communicating longitudinally through said housing and coupling with said frame; and
   a motor coupled to said shaft for rotating said housing between said first and said second positions.

10. A method for collecting solar energy comprising the steps of:
   (a) containing a heat transfer fluid within a housing which includes at least two solar absorption panels thereon;
   (b) holding said housing such that one of said solar absorption panels is maintained in a first position characterized as being illuminated by solar radiation, and such that another one of said solar absorption panels is maintained in a second position characterized as being thermally coupled to said heat transfer fluid for transferring thermal energy thereto;
   (c) exposing said solar absorption panel in said first position to solar radiation;
   (d) moving said housing such that said solar absorption panel in said first position opefatively moves into said second position, and such that said solar absorption panel in said second position operatively moves toward said first position;
   (e) removing from said heat transfer fluid the thermal energy absorbed from said solar absorption panel in said second position; and
   (f) repeating steps (b) through (f).

11. The method as described in claim 10 wherein step (d) includes the preliminary substeps of:
   (d1) detecting the effective temperature of said solar absorption panel in said first position; and
   (d2) enabling the movement of said housing responsive to said temperature of said solar absorption panel exceeding a predetermined temperature limit.

* * * * *